US010841609B1

(12) United States Patent
Liu et al.

(10) Patent No.: US 10,841,609 B1
(45) Date of Patent: Nov. 17, 2020

(54) MODIFICATION OF MOTION VECTOR WITH ADAPTIVE MOTION VECTOR RESOLUTION

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 16/941,039

(22) Filed: Jul. 28, 2020

Related U.S. Application Data

(63) Continuation of application No. PCT/IB2019/058034, filed on Sep. 23, 2019.

(30) Foreign Application Priority Data

Sep. 23, 2018 (WO) ................ PCT/CN2018/107168

(51) Int. Cl.
*H04N 19/52* (2014.01)
*H04N 19/139* (2014.01)
(Continued)

(52) U.S. Cl.
CPC ........... *H04N 19/52* (2014.11); *H04N 19/176* (2014.11); *H04N 19/184* (2014.11)

(58) Field of Classification Search
CPC ..... H04N 19/52; H04N 19/139; H04N 19/513
(Continued)

(56) References Cited

U.S. PATENT DOCUMENTS

2020/0128250 A1* 4/2020 Lee ................. H04N 19/30

FOREIGN PATENT DOCUMENTS

| WO | 2015106126 A1 | 7/2015 |
|---|---|---|
| WO | 2017156705 A1 | 9/2017 |
| WO | 2017157259 A1 | 9/2017 |

OTHER PUBLICATIONS

Bross et al. "Versatile Video Coding (Draft 2)" 11, JVET Meeting; Jul. 10-18, 2018; Ljubljana; (The Joint Video Exploration Team of ISO/IEC JTC1/SC29/WG11 and ITU-T SG.16) Document No. JVET-K1001, Sep. 21, 2018; retrieved from the internet: URL:http://phenix.int-evry.fr/jvet/doc_end_user/documents/11_Ljubljana/wg11?JVET-K1001-v6.zipJVET-K1001-v6.docx, retrieved on Sep. 21, 2018.

(Continued)

*Primary Examiner* — Jeffery A Williams
(74) *Attorney, Agent, or Firm* — Perkins Coie LLP

(57) ABSTRACT

Devices, systems and methods for digital video coding, which includes motion vector predictor derivation and signaling for affine mode with adaptive motion vector resolution (AMVR), are described. An exemplary method for video processing includes determining, for a conversion between current video block and a bitstream representation of the current video block using a coding tool that adaptively selects a resolution for each motion vector associated with the current video block, a final motion vector, wherein a precision of the final motion vector is identical to a precision of a stored motion vector of the current video block; and performing, based on the final motion vector, the conversion between the bitstream representation and the current video block.

20 Claims, 25 Drawing Sheets

(51) Int. Cl.
*H04N 19/513* (2014.01)
*H04N 19/176* (2014.01)
*H04N 19/184* (2014.01)

(58) Field of Classification Search
USPC .................................................. 375/240.16
See application file for complete search history.

(56) References Cited

OTHER PUBLICATIONS

Chen et al. JVET-G1001 "Algorithm Description of Joint Video Exploration Test Model 7 (JEM7)," Joint Video Exploration Team (JVET) of ITU-T SG 16 WP 3 and ISO-IEC JTC 1/SC 29/WG 11, 7th Meeting, Jul. 13-21, 2017, Torino, Aug. 19, 2017, Retrieved from the internet: URL:http://phenix.int-evry.fr/jvet/doc_end_user/documents/7_Torino/wg11/JVET-G0001-v1.zip.

Han et al. CE4.1.3: Affine Motion Compensation Prediction, Joint Video Exploration Team (JVET) of ITU-T SG 16 WP3 and ISO/IEC JTC 1/SC 29/WG 11, 11th Meeting: Ljubljana, SI, Jul. 10-18, 2018, Document JVET-K0337.

Li et al. "An Efficient Four Parameter Affine Motion Model for Video Coding," IEE Transactions on Circuits and Systems for Video Technology, Aug. 2018, 28(8):1934-1948.

Liu et al. "CE4-Related: Adaptive Motion Vector Resolution for Affine Inter Mode," 12, JVET Meeting; Oct. 3-12, 2018, Macao; The Joint Video Exploration Team of ISO/IEC JTC1/SC29/WG11 and ITU-T SG.16, Document No. JVET-L0332, Oct. 5, 2018, Retrieved from the Internet: URL:http://phenix.int-evry.fr/jvet/doc_end_user/documents/12_Macao/wg11/JVET-L0332-v2.zip JVET-L0332.docx, retrieved on Oct. 5, 2018.

Rosewarne C et al. "High Efficiency Video Coding (HEVC) Test Model 16 (HM16) Improved Encoder Description Update 7", 25th meeting, JCT-VC Meeting; Oct. 14-21, 2016; Chengdu, CN, Joint Collaborative Team on Video Coding of ITU-T SG 16 WP3 and ISO/IEC JTC1/SC29/WG11, document JCTVC-Y1002.

Yang et al. "CE4: Summary Report on Inter Prediction and Motion Vector Coding," 11, JVET Meeting, Jul. 10-18, 2018, Ljubljana; The Joint Video Exploration Team of ISO/IEC JTC1/SC29/WG11 and ITU-T SG.16, Document No. JVET-K0024, Jul. 12, 2018, retrieved from the internet: URL:http://phenix.int-evry.fr/jvet/doc_end_user/documents/11_Ljubljana/wg11/JVET-K0024-v4.zip JVET-K0024_r3.docx, retrieved on Jul. 12, 2018.

Yang et al. "BoG Report on CE4 Related Contributions," 11, JVET Meeting, Jul. 11-18, 2018; Ljubljana, The Joint Video Exploration Team of ISO/IEC JTC1/SC29/WG11 and ITU-T SG.16, document No. JVET-K0546, Jul. 14, 2018, Retrieved from the internet: URL:http://phenix.int-evry.fr/jvet/doc_end_user/docuements/11_Ljubljana/wg11/JVET-K0546-v1.zip JVET-K0546.docx, retrieved on Jul. 14, 2018.

"High Efficiency Video Coding," Series H: Audiovisual Media Systems: Infrastructure of Audiovisual Services—Coding of moving video, ITU-T and ISO/IEC, ITU-T H.265, ISO/IEC 23008-2, Feb. 2018.

JEM-7.0:—https://jvet.hhi.fraunhofer.de/svn/svn_HMJEMSoftware/tags/ HM-16.6-38JEM-7.0 (Accessed on Apr. 21, 2020).

International Search Report and Written Opinion from PCT/IB2019/058034 dated Jan. 8, 2020 (19 pages).

International Search Report and Written Opinion from PCT/IB2019/058035 dated Jan. 8, 2020 (20 pages).

\* cited by examiner

2300 — Determining, for a conversion between current video block and a bitstream representation of the current video block using a coding tool that adaptively selects a resolution for each motion vector associated with the current video block, a final motion vector, the current video block being coded with an affine mode, and the bitstream representation comprising a field comprising more than one bit that is indicative of a precision of a motion vector or a motion vector difference associated with the current video block — 2310

2320 — Performing, based on the final motion vector, the conversion between the bitstream representation and the current video block

MODIFICATION OF MOTION VECTOR WITH ADAPTIVE MOTION VECTOR RESOLUTION

CROSS-REFERENCE TO RELATED APPLICATIONS

This application is a continuation of International Application No. PCT/IB2019/058034 filed on Sep. 23, 2019, which claims the priority to and benefits of International Patent Application No. PCT/CN2018/107168, filed on Sep. 23, 2018. For all purposes under the law, the entire disclosures of the aforementioned applications are incorporated by reference as part of the disclosure of this application.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to motion vector predictor derivation and signaling for affine mode with adaptive motion vector resolution (AMVR) are described. The described methods may be applied to both the existing video coding standards (e.g., High Efficiency Video Coding (HEVC)) and future video coding standards or video codecs.

In one representative aspect, the disclosed technology may be used to provide a method for video processing. This method includes determining, for a conversion between current video block and a bitstream representation of the current video block using a coding tool that adaptively selects a resolution for each motion vector associated with the current video block, a final motion vector, wherein a precision of the final motion vector is identical to a precision of a stored motion vector of the current video block; and performing, based on the final motion vector, the conversion between the bitstream representation and the current video block.

In another representative aspect, the disclosed technology may be used to provide a method for video processing. This method includes determining, for a conversion between current video block and a bitstream representation of the current video block using a coding tool that adaptively selects a resolution for each motion vector associated with the current video block, a final motion vector, wherein the current video block is coded with an affine mode, and wherein the bitstream representation comprises a field comprising more than one bit that is indicative of a precision of a motion vector or a motion vector difference associated with the current video block; and performing, based on the final motion vector, the conversion between the bitstream representation and the current video block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 23 shows a flowchart of another example method for video processing.

DETAILED DESCRIPTION

Figure 1:
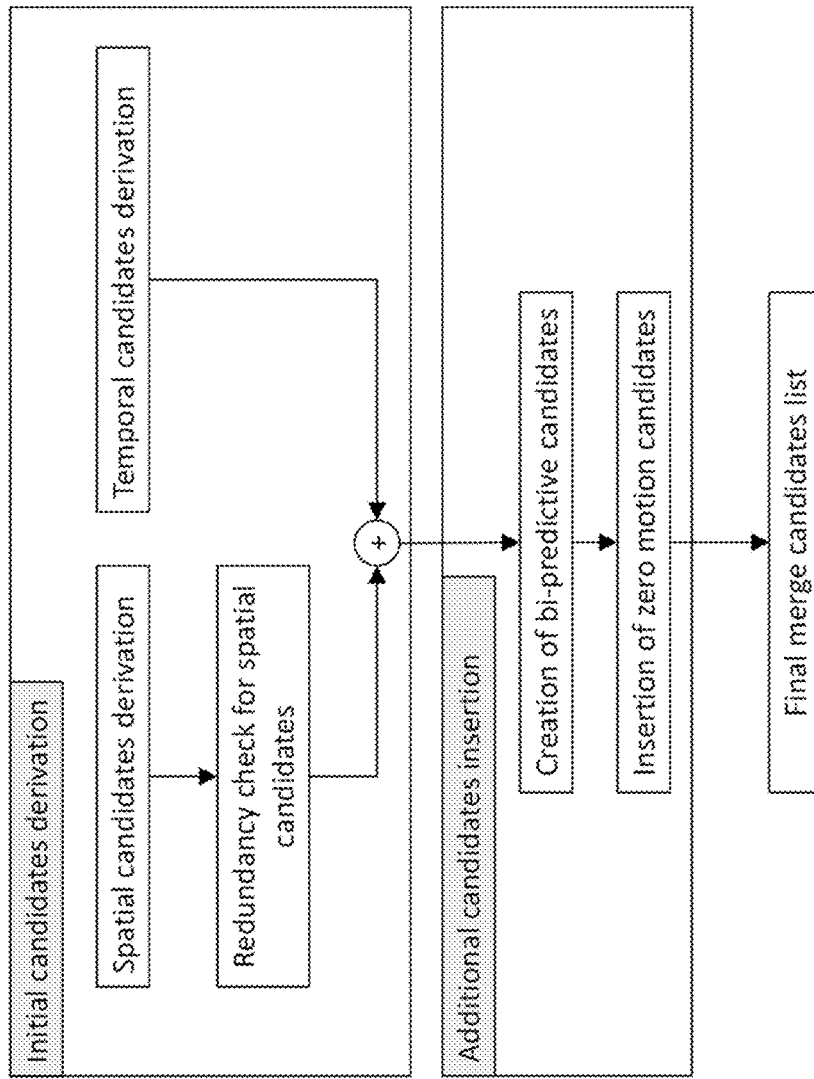
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2) [1], the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices [2].

When signaling indicates that both of the reference picture lists are to be used, the PU is produced from two blocks of samples. This is referred to as 'bi-prediction'. Bi-prediction is available for B-slices only.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
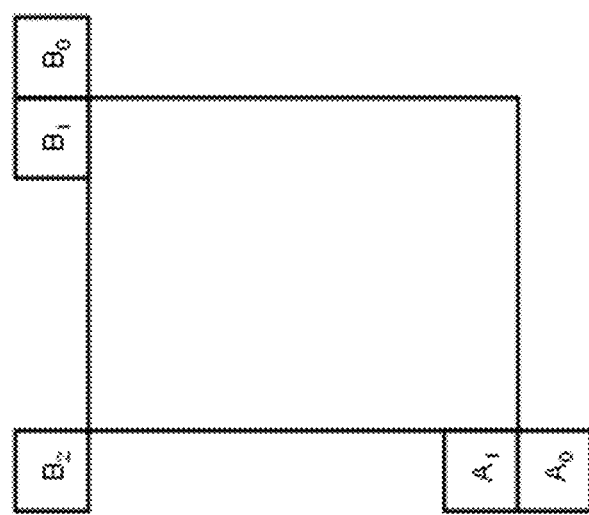
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
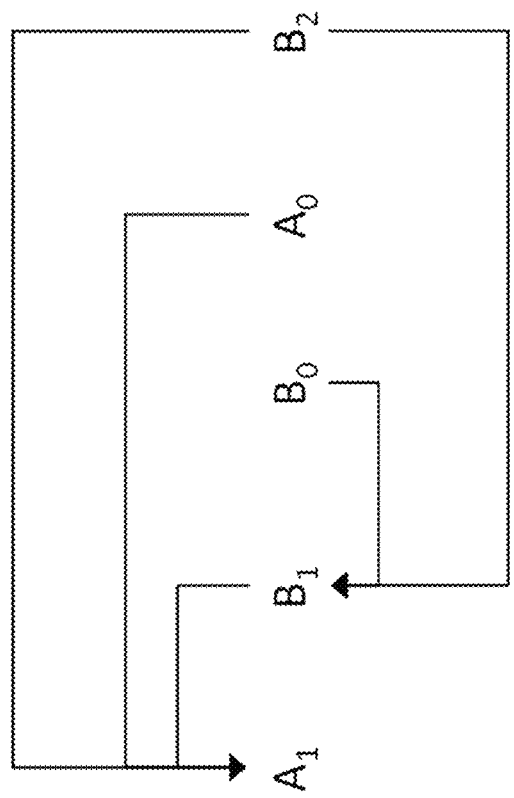
FIG. 3 shows an example of candidate pairs subject to a redundancy check of spatial merge candidates.
Figure 4B:
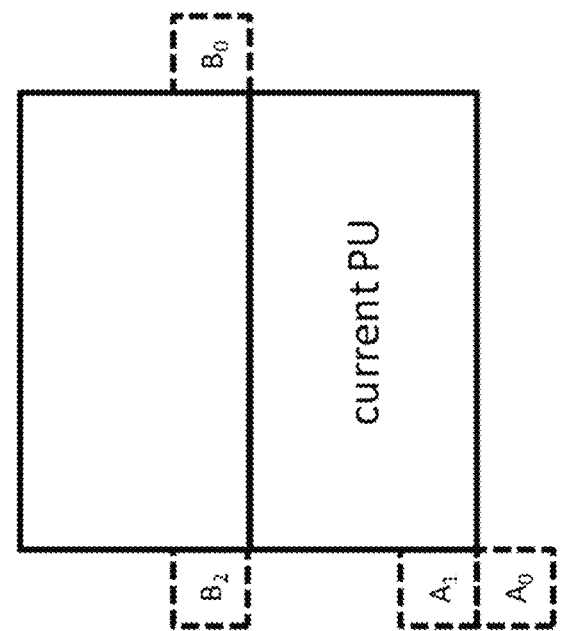
FIGS. 4A and 4B show examples of the position of a second prediction unit (PU) based on the size and shape of the current block.
Figure 4A:
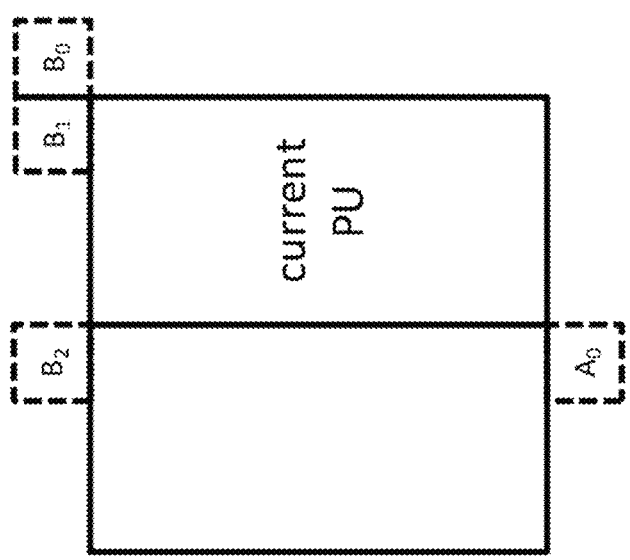

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
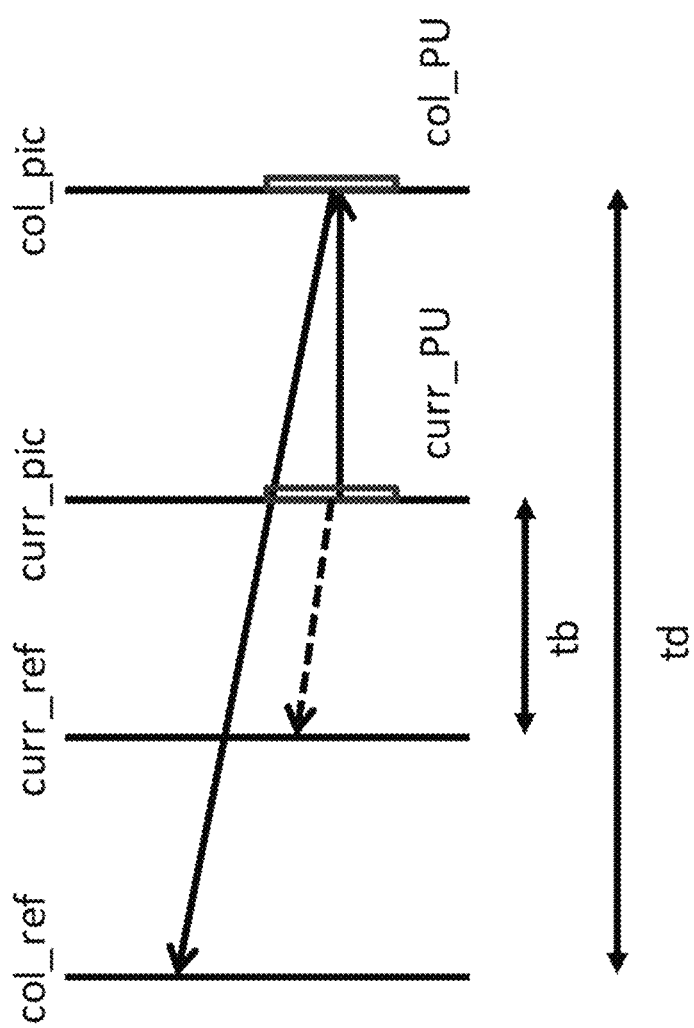
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
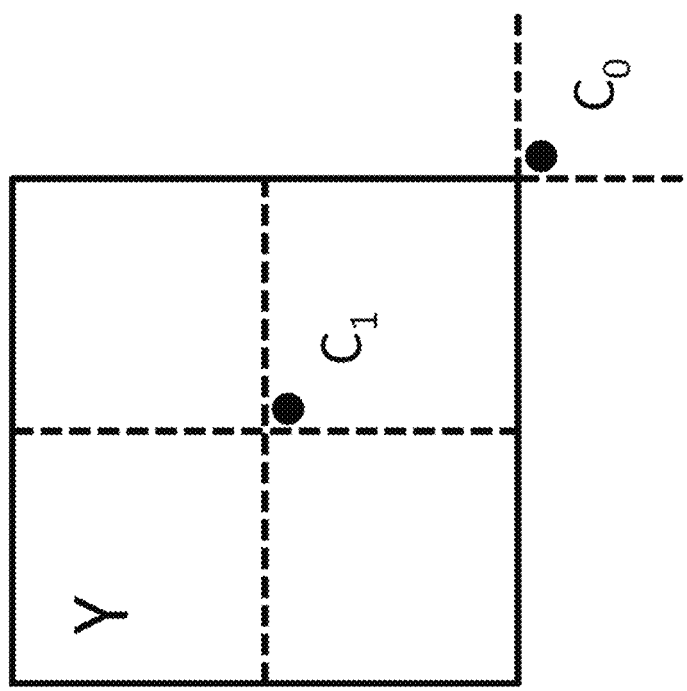
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
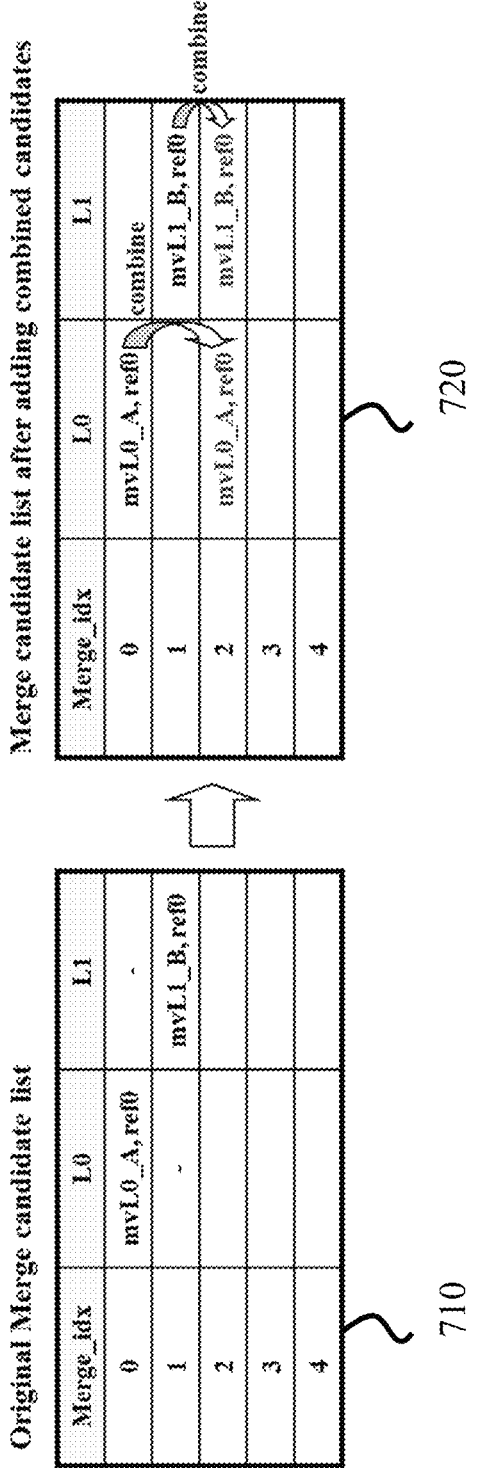
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log2_parallel_merge_level_minus2" syntax element. When a MER is defined, merge candidates falling in the same region are marked as unavailable and therefore not considered in the list construction.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Constructing Motion Vector Prediction Candidates

Figure 8:
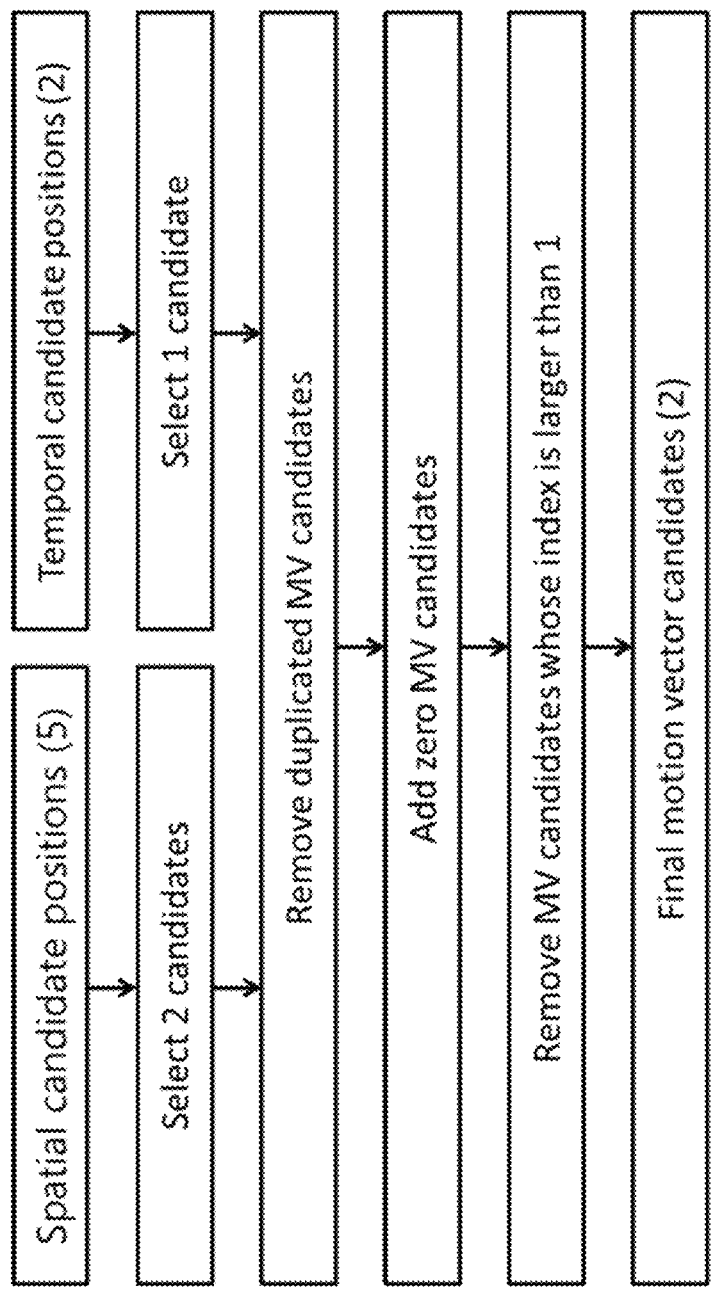
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
 (1) Same reference picture list, and same reference picture index (same POC)
 (2) Different reference picture list, but same reference picture (same POC)
Spatial scaling
 (3) Same reference picture list, but different reference picture (different POC)
 (4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
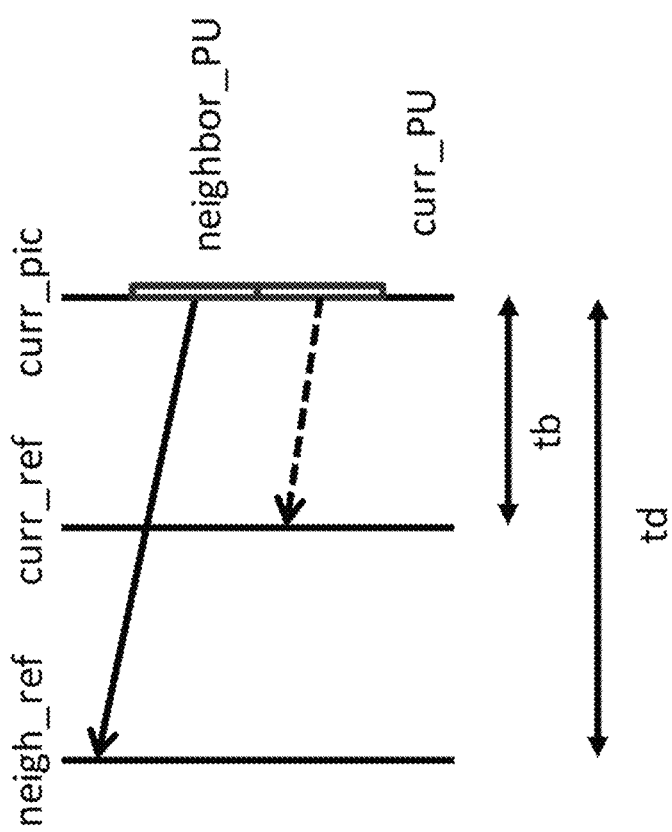
FIG. 9 shows an example of motion vector scaling for spatial motion vector candidates.

As shown in the example in FIG. 9, for the spatial scaling case, the motion vector of the neighbouring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM) [3][4]. In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
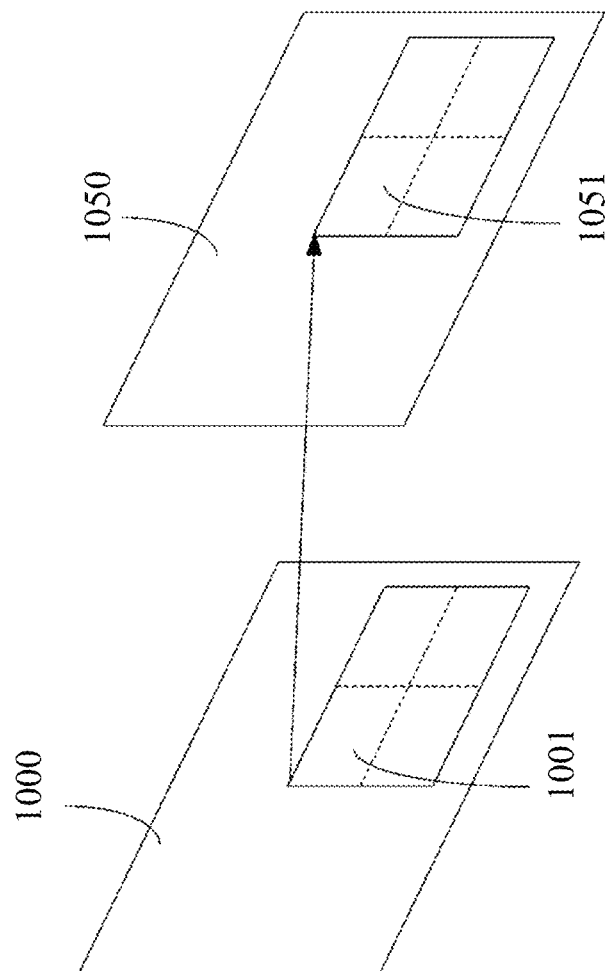
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

2.1.2 Examples of Spatial-Temporal Motion Vector Prediction (STMVP)

Figure 11:
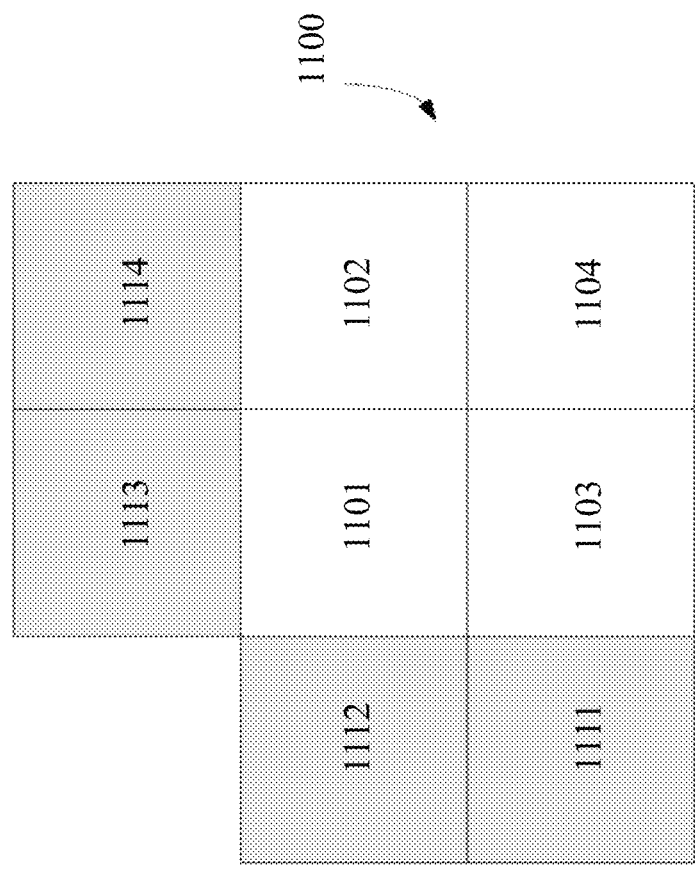
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.3 Examples of Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to $1/16$ pel. The higher motion vector accuracy ($1/16$ pel) is used in motion compensation inter prediction for the CU coded with skip/merge mode. For the CU coded with normal AMVP mode, either the integer-pel or quarter-pel motion is used.

SHVC upsampling interpolation filters, which have same filter length and normalization factor as HEVC motion compensation interpolation filters, are used as motion compensation interpolation filters for the additional fractional pel positions. The chroma component motion vector accuracy is $1/32$ sample in the JEM, the additional interpolation filters of $1/32$ pel fractional positions are derived by using the average of the filters of the two neighbouring $1/16$ pel fractional positions.

2.4 Examples of Overlapped Block Motion Compensation (OBMC)

In the JEM, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, an MC block corresponds to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as shown in FIGS. 12A and 12B.

Figure 12A:
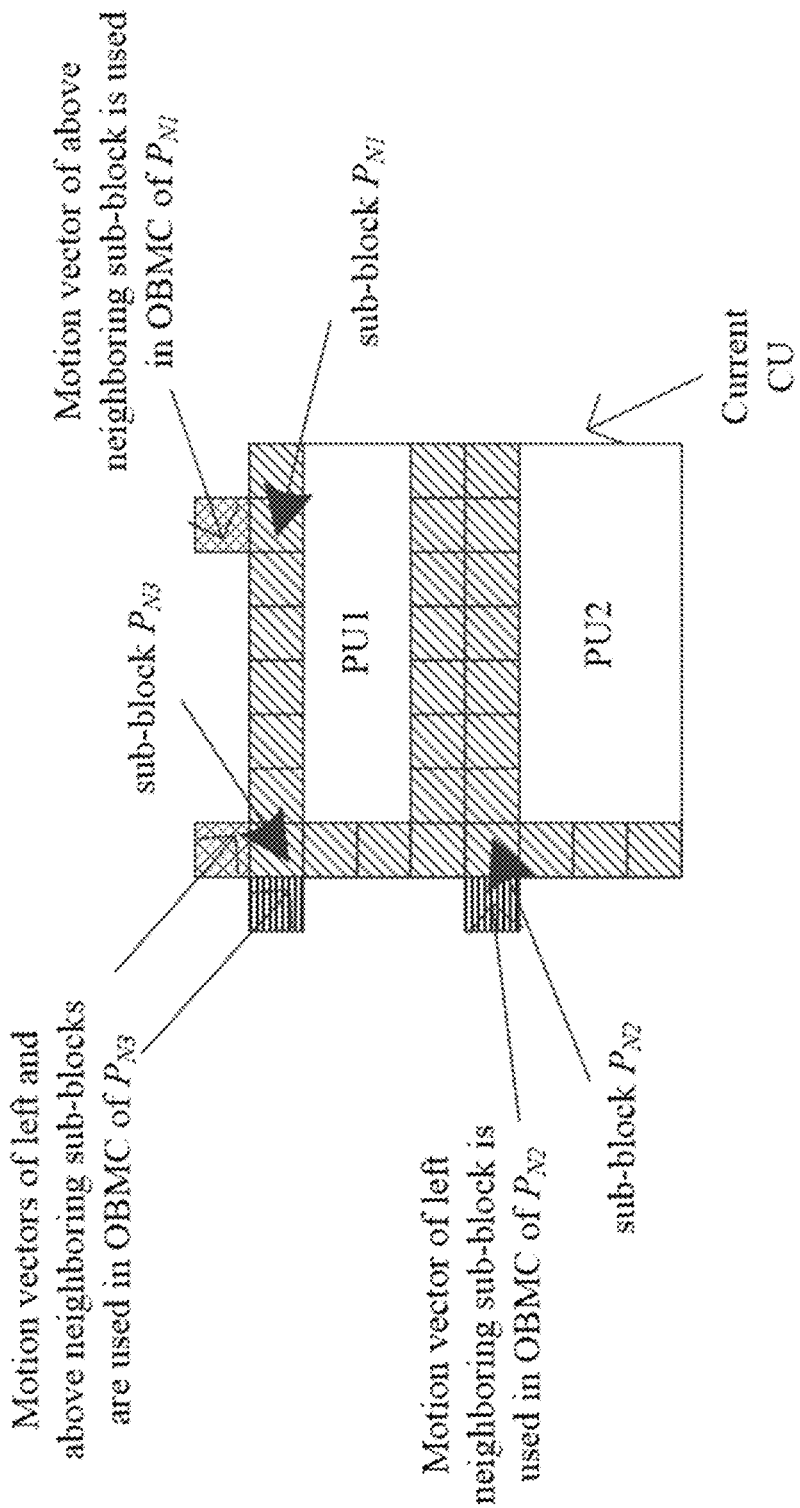
FIGS. 12A and 12B show example snapshots of sub-block when using the overlapped block motion compensation (OBMC) algorithm.
Figure 12B:
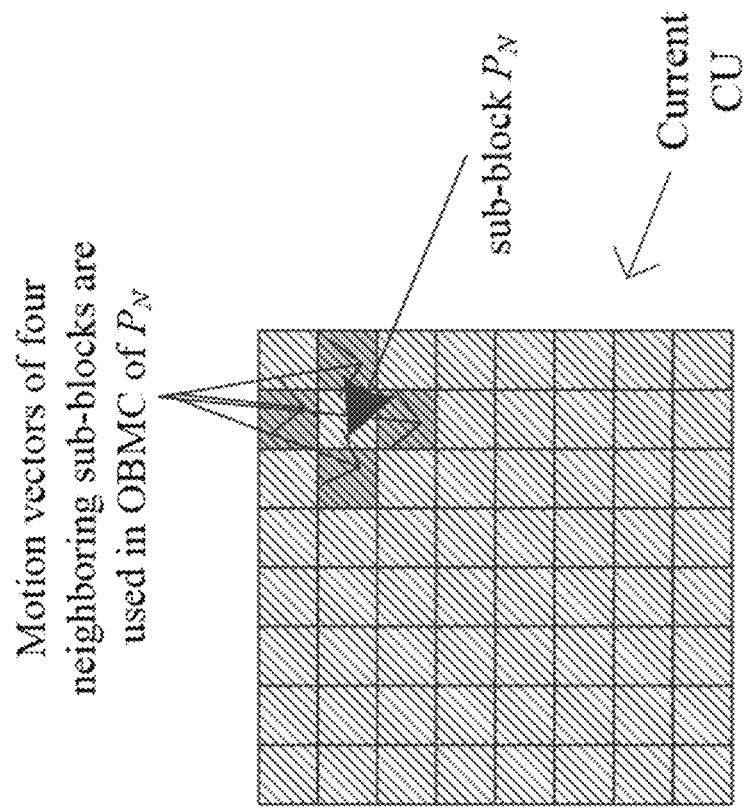

FIG. 12A shows sub-blocks at the CU/PU boundary, and the hatched sub-blocks are where OBMC applies. Similarly, FIG. 12B shows the sub-Pus in ATMVP mode.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighboring sub-block is denoted as PN, with N indicating an index for the neighboring above, below, left and right sub-blocks and prediction block based on motion vectors of the current sub-block is denoted as PC. When PN is based on the motion information of a neighboring sub-block that contains the same motion information to the current sub-block, the OBMC is not performed from PN. Otherwise, every sample of PN is added to the same sample in PC, i.e., four rows/columns of PN are added to PC. The weighting factors $\{1/4, 1/8, 1/16, 1/32\}$ are used for PN and the weighting factors $\{3/4, 7/8, 15/16, 31/32\}$ are used for PC. The exception are small MC blocks, (i.e., when height or width of the coding block is equal to 4 or a CU is coded with sub-CU mode), for which only two rows/columns of PN are added to PC. In this case weighting factors $\{1/4, 1/8\}$ are used for PN and weighting factors $\{3/4, 7/8\}$ are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

2.5 Examples of Local Illumination Compensation (LIC)

LIC is based on a linear model for illumination changes, using a scaling factor a and an offset b. And it is enabled or disabled adaptively for each inter-mode coded coding unit (CU).

Figure 13:
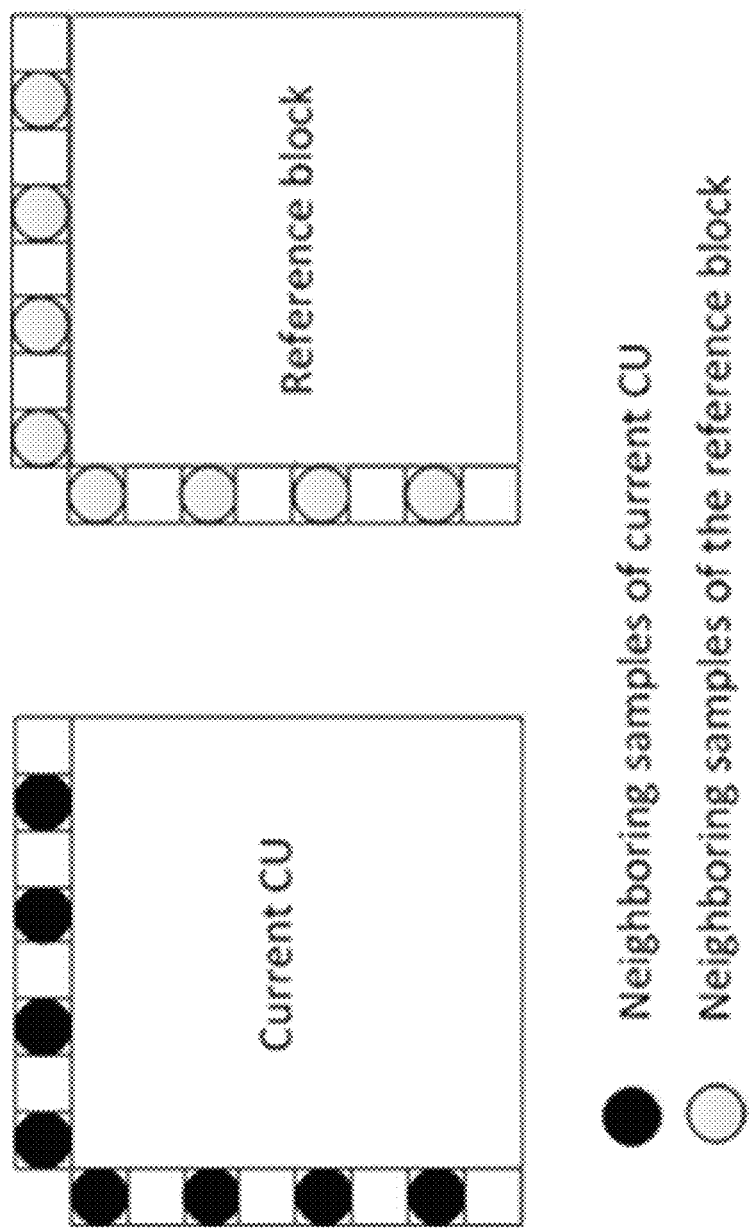
FIG. 13 shows an example of neighboring samples used to derive parameters for the local illumination compensation (LIC) algorithm.

When LIC applies for a CU, a least square error method is employed to derive the parameters a and b by using the neighboring samples of the current CU and their corresponding reference samples. FIG. 13 shows an example of neighboring samples used to derive parameters of the IC algorithm. Specifically, and as shown in FIG. 13, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

When LIC is enabled for a picture, an additional CU level RD check is needed to determine whether LIC is applied or not for a CU. When LIC is enabled for a CU, the mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM:

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.6 Examples of Affine Motion Compensation Prediction

Figure 14:
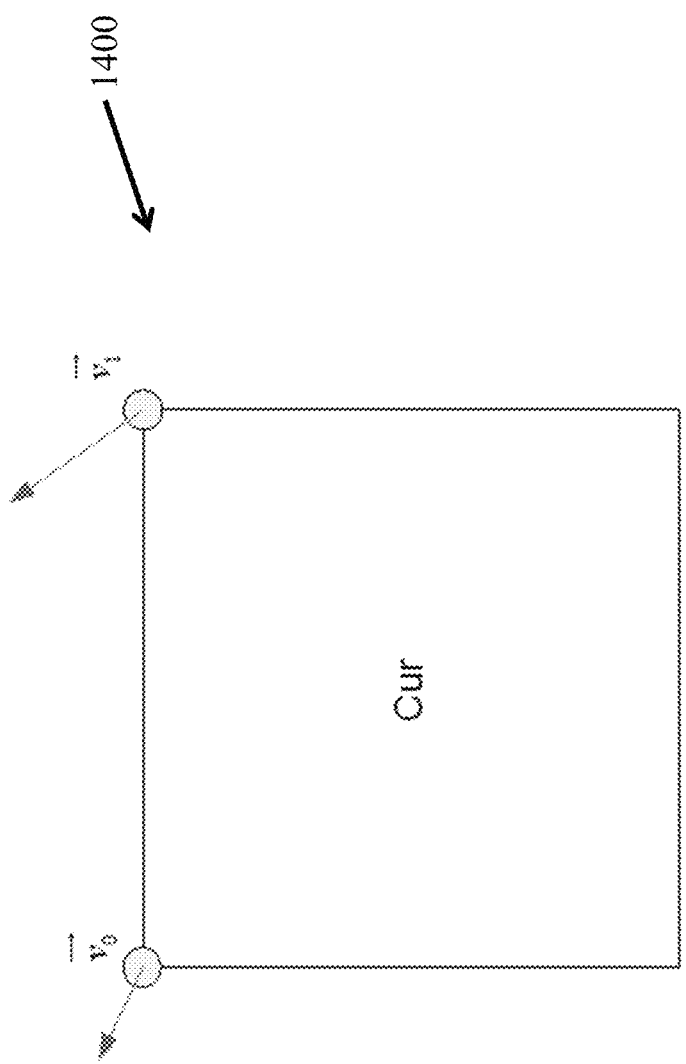
FIG. 14 shows an example of a simplified affine motion model.

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 14 shows an example of an affine motion field of a block 1400 described by two control point motion vectors $V_0$ and $V_1$. The motion vector field (MVF) of the block 1400 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \qquad \text{Eq. (1)}$$

As shown in FIG. 14, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = clip3\left(4, w, \frac{w \times MvPre}{\max(\text{abs}(v_{1x} - v_{0x}), \text{abs}(v_{1y} - v_{0y}))}\right) \\ N = clip3\left(4, h, \frac{h \times MvPre}{\max(\text{abs}(v_{2x} - v_{0x}), \text{abs}(v_{2y} - v_{0y}))}\right) \end{cases} \qquad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 15:
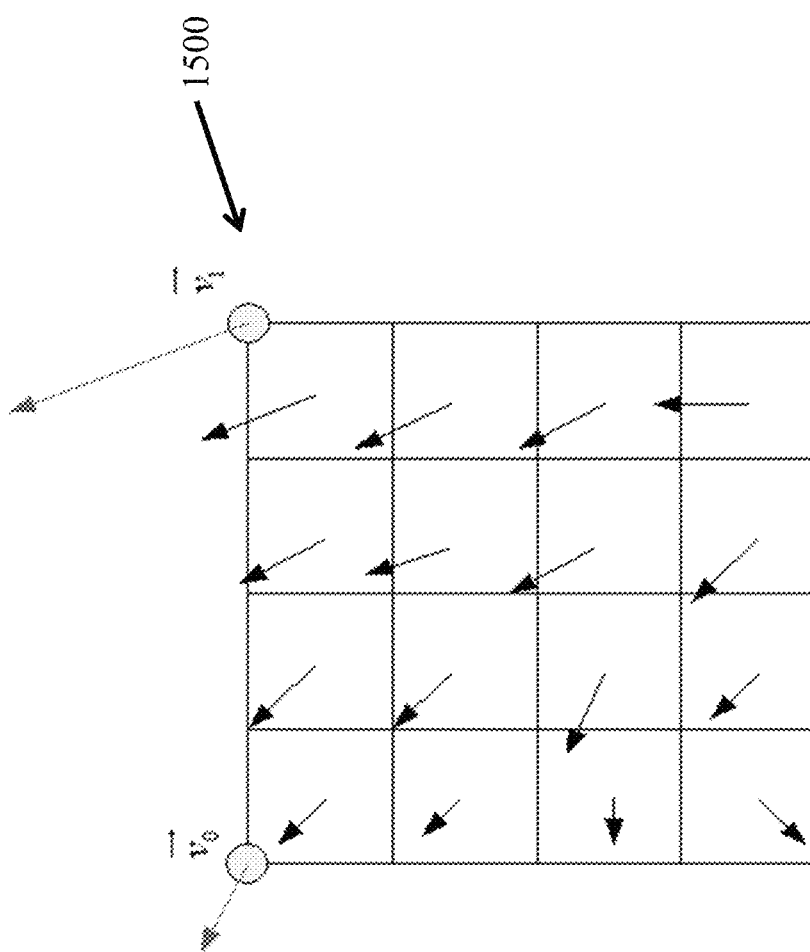
FIG. 15 shows an example of an affine motion vector field (MVF) per sub-block.

FIG. 15 shows an example of affine MVF per sub-block for a block 1500. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

2.6.1 Embodiments of the AF_INTER Mode

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1)|v_0 = \{v_A, v_B, v_C\}, v_1 = \{v_D, v_E\}\}$ is constructed using the neighboring blocks.

Figure 16:
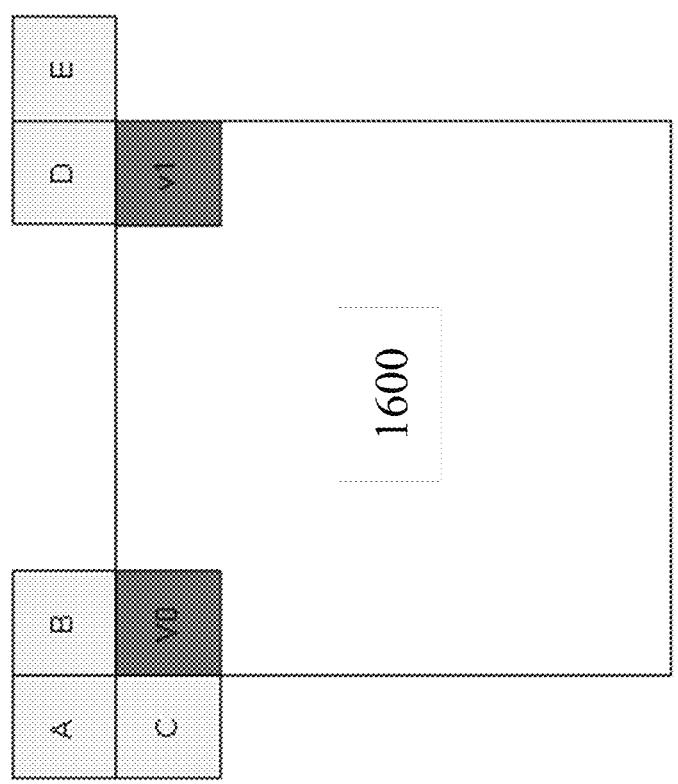
FIG. 16 shows an example of motion vector prediction (MVP) for the AF_INTER affine motion mode.

FIG. 16 shows an example of motion vector prediction (MVP) for a block 1600 in the AF_INTER mode. As shown in FIG. 16, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

Figure 17B:
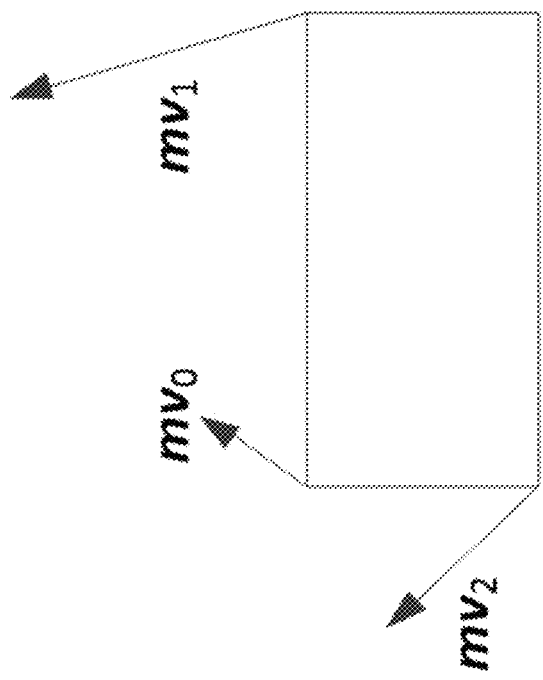
FIGS. 17A and 17B show examples of the 4-parameter and 6-parameter affine models, respectively.
Figure 17A:
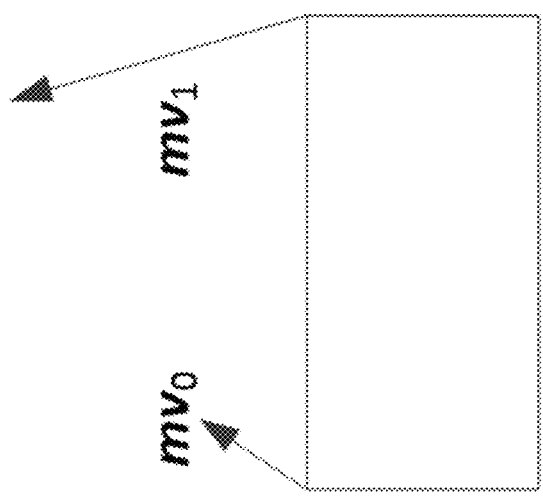

In AF_INTER mode, when 4/6 parameter affine mode is used, 2/3 control points are required, and therefore 2/3 MVD needs to be coded for these control points, as shown in FIG. 17. In an existing implementation [5], the MV may be derived as follows, e.g., it predicts $mvd_1$ and $mvd_2$ from $mvd_0$.

Figure 18B:
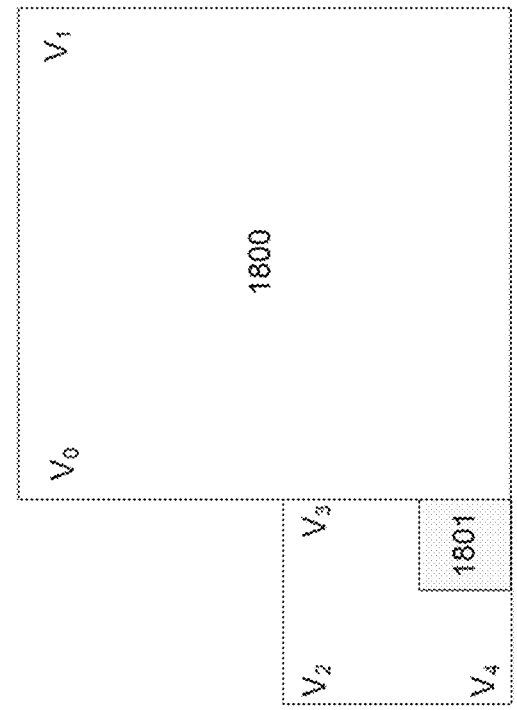
FIGS. 18A and 18B show example candidates for the AF_MERGE affine motion mode.

$mv_0 = \overline{mv}_0 + mvd_0$ $mv_1 = \overline{mv}_1 + mvd_1 + mvd_0$ $mv_2 = \overline{mv}_2 + mvd_2 + mvd_0$ Herein, $\overline{mv}_1$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 18B. In some embodiments, the addition of two motion vectors (e.g., mvA(xA, yA) and mvB(xB, yB)) is equal to summation of two components separately. For example, newMV=mvA+mvB implies that the two components of newMV are set to (xA+xB) and (yA+yB), respectively.

2.6.2 Examples of Fast Affine ME Algorithms in AF_INTER Mode

In some embodiments of the affine mode, MV of 2 or 3 control points needs to be determined jointly. Directly searching the multiple MVs jointly is computationally complex. In an example, a fast affine ME algorithm [6] is proposed and is adopted into VTM/BMS.

For example, the fast affine ME algorithm is described for the 4-parameter affine model, and the idea can be extended to 6-parameter affine model:

$$\begin{cases} x' = ax + by + c \\ y' = -bx + ay + d \end{cases} \quad \text{Eq. (3)}$$

$$\begin{cases} mv^h_{(x,y)} = x' - x = (a-1)x + by + c \\ mv^v_{(x,y)} = y' - y = -bx + (a-1)y + d \end{cases} \quad \text{Eq. (4)}$$

Replacing (a−1) with a' enables the motion vectors to be rewritten as:

$$\begin{cases} mv^h_{(x,y)} = x' - x = a'x + by + c \\ mv^v_{(x,y)} = y' - y = -bx + a'y + d \end{cases} \quad \text{Eq. (5)}$$

If it is assumed that the motion vectors of the two controls points (0, 0) and (0, w) are known, from Equation (5) the affine parameters may be derived as:

$$\begin{cases} c = mv^h_{(0,0)} \\ d = mv^v_{(0,0)} \end{cases} \quad \text{Eq. (6)}$$

The motion vectors can be rewritten in vector form as:

$$MV(p) = A(P) * MV_C^T. \quad \text{Eq. (7)}$$

Herein, P=(x, y) is the pixel position, $$A(P) = \begin{bmatrix} 1 & x & 0 & y \\ 0 & y & 1 & -x \end{bmatrix}, \text{ and} \quad \text{Eq. (8)}$$

$$MV_C = [\, mv^h_{(0,0)} \quad a \quad mv^v_{(0,0)} \quad b\,]. \quad \text{Eq. (9)}$$

In some embodiments, and at the encoder, the MVD of AF_INTER may be derived iteratively. Denote $MV^i(P)$ as the MV derived in the ith iteration for position P and denote $dMV_C^i$ as the delta updated for $MV_C$ in the ith iteration. Then in the (i+1)th iteration, $$MV^{i+1}(P) = A(P) * ((MV_C^i)^T + (dMV_C^i)^T) \quad \text{Eq. (10)}$$
$$= A(P) * (MV_C^i)^T + A(P) * (dMV_C^i)^T$$
$$= MV^i(P) + A(P) * (dMV_C^i)^T.$$

Denote $Pic_{ref}$ as the reference picture and denote $Pic_{cur}$ as the current picture and denote $Q=P+MV^i(P)$. If the MSE is used as the matching criterion, then the function that needs to be minimized may be written as:

$$\min \sum_P (Pic_{cur}(P) - Pic_{ref}(P + MV^{i+1}(P)))^2 = \quad \text{Eq. (11)}$$
$$\min \sum_P (Pic_{cur}(P) - Pic_{ref}(Q + A(P) * (dMV_C^i)^T))^2$$

If it is assumed that $(dMV_C^i)^T$ is small enough, $Pic_{ref}(Q+A(P)*(dMV_C^i)^T)$ may be rewritten, as an approximation based on a 1-st order Taylor expansion, as:

$$Pic_{ref}(Q+A(P)*(dMV_C^i)^T) \approx Pic_{ref}(Q)+Pic_{ref}'(Q)*A(P)*(dMV_C^i)^T. \quad \text{(12)}$$

Herein, $$Pic_{ref}'(Q) = \left[ \frac{dPic_{ref}(Q)}{dx} \quad \frac{dPic_{ref}(Q)}{dy} \right].$$

If the notation $E^{i+1}(P)=Pic_{cur}(P)-Pic_{ref}(Q)$ is adopted, then:

$$\min \sum_P (Pic_{cur}(P) - Pic_{ref}(Q) - Pic_{ref}'(Q) * A(P) * (dMV_C^i)^T)^2 = \quad \text{Eq. (13)}$$
$$\min \sum_P (E^{i+1}(P) - Pic_{ref}'(Q) * A(P) * (dMV_C^i)^T)^2$$

The term $dMV_C^i$ may be derived by setting the derivative of the error function to zero, and then computing delta MV of the control points (0, 0) and (0, w) according to $A(P)*(dMV_C^i)^T$, as follows:

$$dMV_{(0,0)}^h = dMV_C^i[0] \quad \text{Eq. (14)}$$

$$dMV_{(0,w)}^h = dMV_C^i[1]*w + dMV_C^i[2] \quad \text{Eq. (15)}$$

$$dMV_{(0,0)}^v = dMV_C^i[2] \quad \text{Eq. (16)}$$

$$dMV_{(0,w)}^v = -dMV_C^i[3]*w + dMV_C^i[2] \quad \text{Eq. (17)}$$

In some embodiments, this MVD derivation process may be iterated n times, and the final MVD may be calculated as follows:

$$fdMV_{(0,0)}^h = \Sigma_{i=0}^{n-1} dMV_C^i[0] \quad \text{Eq. (18)}$$

$$fdMV_{(0,w)}^h = \Sigma_{i=0}^{n-1} dMV_C^i[1]*w + \Sigma_{i=0}^{n-1} dMV_C^i[0] \quad \text{Eq. (19)}$$

$$fdMV_{(0,0)}^v = \Sigma_{i=0}^{n-1} dMV_C^i[2] \quad \text{Eq. (20)}$$

$$fdMV_{(0,w)}^v = \Sigma_{i=0}^{n-1} -dMV_C^i[3]*w + \Sigma_{i=0}^{n-1} dMV_C^i[2] \quad \text{Eq. (21)}$$

In the aforementioned implementation [5], predicting delta MV of control point (0, w), denoted by $mvd_1$ from delta MV of control point (0, 0), denoted by $mvd_0$, results in only $(\Sigma_{i=0}^{n-1} -dMV_C^i[1]*w, +\Sigma_{i=0}^{n-1} -dMV_C^i[3]*w)$ being encoded for $mvd_1$.

2.6.3 Embodiments of the AF_MERGE Mode

Figure 18A:
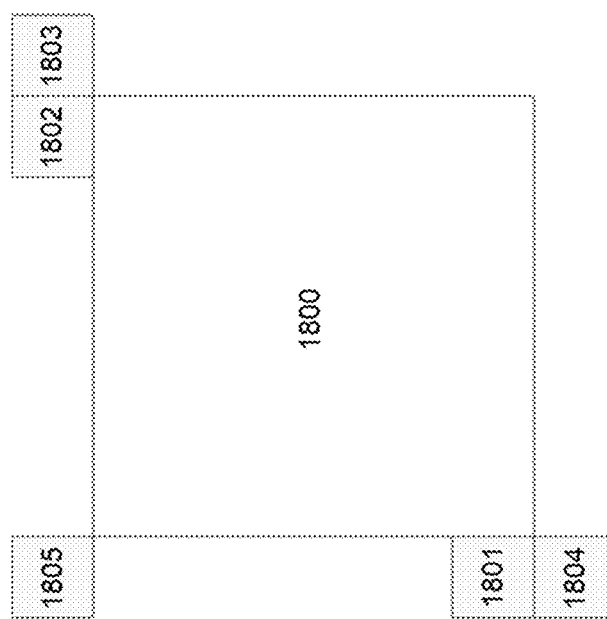

When a CU is applied in AF_MERGE mode, it gets the first block coded with an affine mode from the valid neighboring reconstructed blocks. FIG. 18A shows an example of the selection order of candidate blocks for a current CU 1800. As shown in FIG. 18A, the selection order can be from left (1801), above (1802), above right (1803), left bottom (1804) to above left (1805) of the current CU 1800. FIG. 18B shows another example of candidate blocks for a current CU 1800 in the AF_MERGE mode. If the neighboring left bottom block 1801 is coded in affine mode, as shown in FIG. 18B, the motion vectors $v_2$, $v_3$ and $v_4$ of the top left corner, above right corner, and left bottom corner of the CU containing the sub-block 1801 are derived. The motion vector $v_0$ of the top left corner on the current CU 1800 is calculated based on v2, v3 and v4. The motion vector v1 of the above right of the current CU can be calculated accordingly.

After the CPMV of the current CU v0 and v1 are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

2.7 Examples of Pattern Matched Motion Vector Derivation (PMMVD)

The PMMVD mode is a special merge mode based on the Frame-Rate Up Conversion (FRUC) method. With this mode, motion information of a block is not signaled but derived at decoder side.

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (3), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad \text{Eq. (3)}$$

Figure 19:
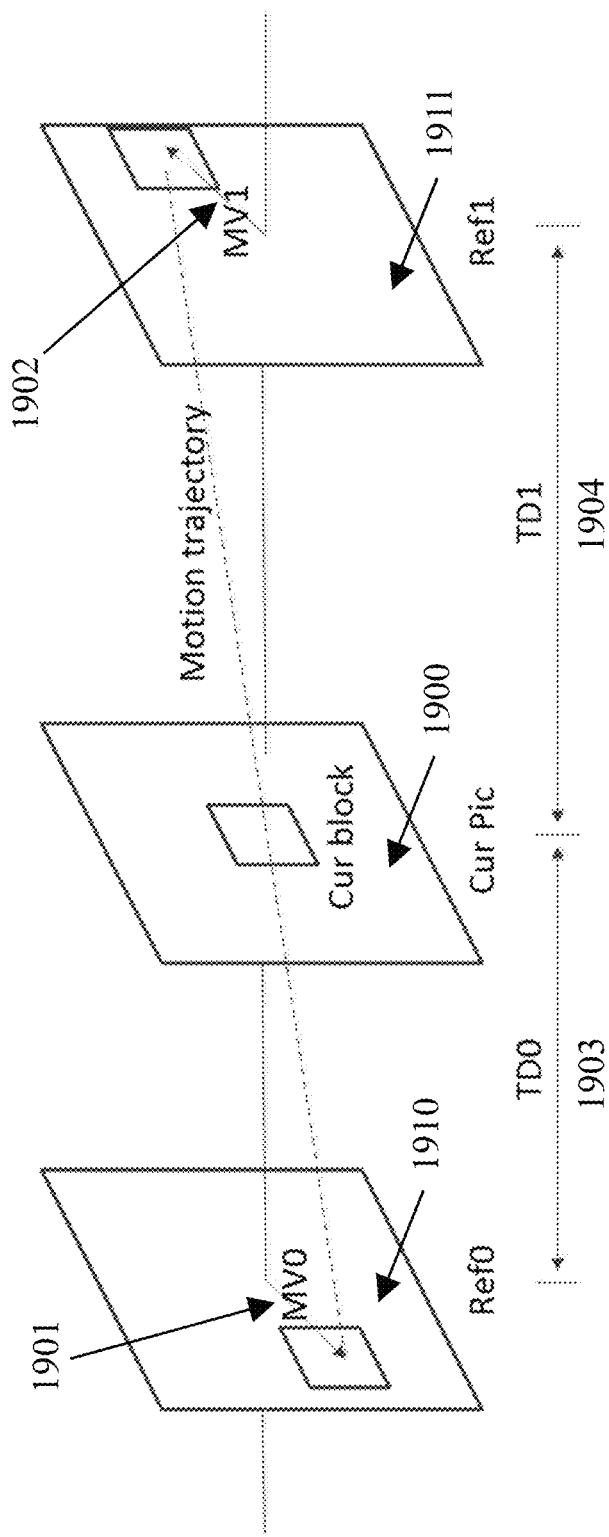
FIG. 19 shows an example of bilateral matching in pattern matched motion vector derivation (PMMVD) mode, which is a special merge mode based on the frame-rate up conversion (FRUC) algorithm.

FIG. 19 shows an example of bilateral matching used in the Frame-Rate Up Conversion (FRUC) method. The bilateral matching is used to derive motion information of the current CU by finding the closest match between two blocks along the motion trajectory of the current CU (1900) in two different reference pictures (1910, 1911). Under the assumption of continuous motion trajectory, the motion vectors MV0 (1901) and MV1 (1902) pointing to the two reference blocks are proportional to the temporal distances, e.g., TD0 (1903) and TD1 (1904), between the current picture and the two reference pictures. In some embodiments, when the current picture 1900 is temporally between the two reference pictures (1910, 1911) and the temporal distance from the current picture to the two reference pictures is the same, the bilateral matching becomes mirror based bi-directional MV.

Figure 20:
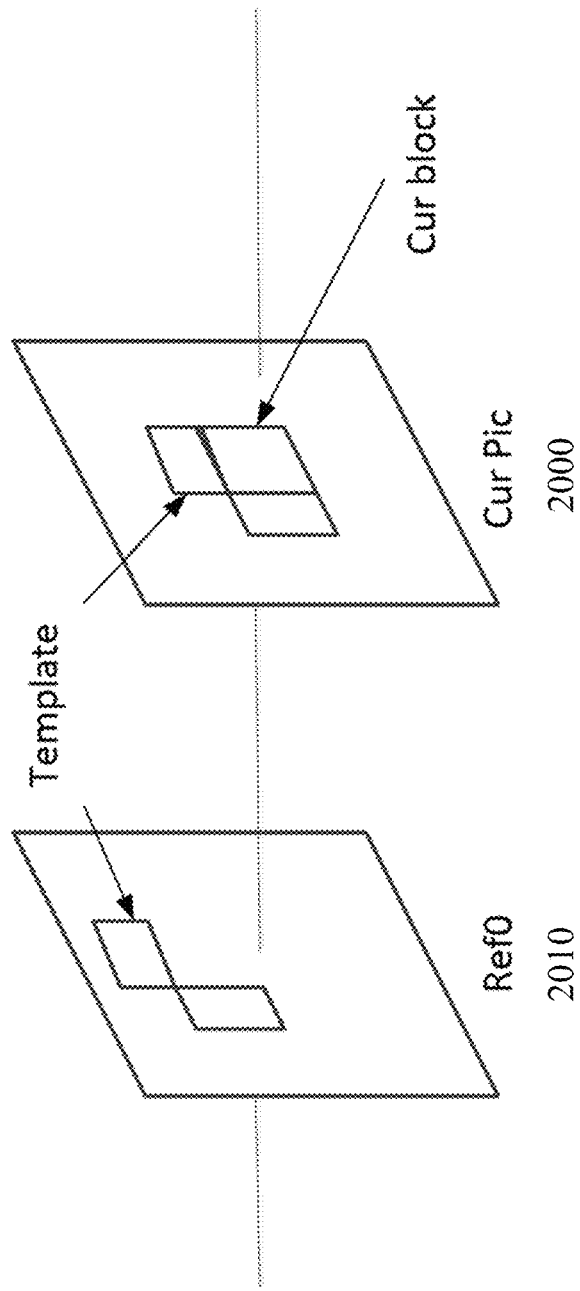
FIG. 20 shows an example of template matching in the FRUC algorithm.

FIG. 20 shows an example of template matching used in the Frame-Rate Up Conversion (FRUC) method. Template matching can be used to derive motion information of the current CU 2000 by finding the closest match between a template (e.g., top and/or left neighboring blocks of the current CU) in the current picture and a block (e.g., same size to the template) in a reference picture 2010. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $\text{ref}_a$) at reference list A. Then the reference picture $\text{ref}_b$ of its paired bilateral MV is found in the other reference list B so that $\text{ref}_a$ and $\text{ref}_b$ are temporally at different sides of the current picture. If such a $\text{ref}_b$ is not available in reference list B, $\text{ref}_b$ is determined as a reference which is different from $\text{ref}_a$ and its temporal distance to the current picture is the minimal one in list B. After $\text{ref}_b$ is determined, MVb is derived by scaling MVa based on the temporal distance between the current picture and $\text{ref}_a$, $\text{ref}_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an Interpolated MV Field.

Before coding a frame, interpolated motion field is generated for the whole picture based on unilateral ME. Then the motion field may be used later as CU level or sub-CU level MV candidates.

Figure 21:
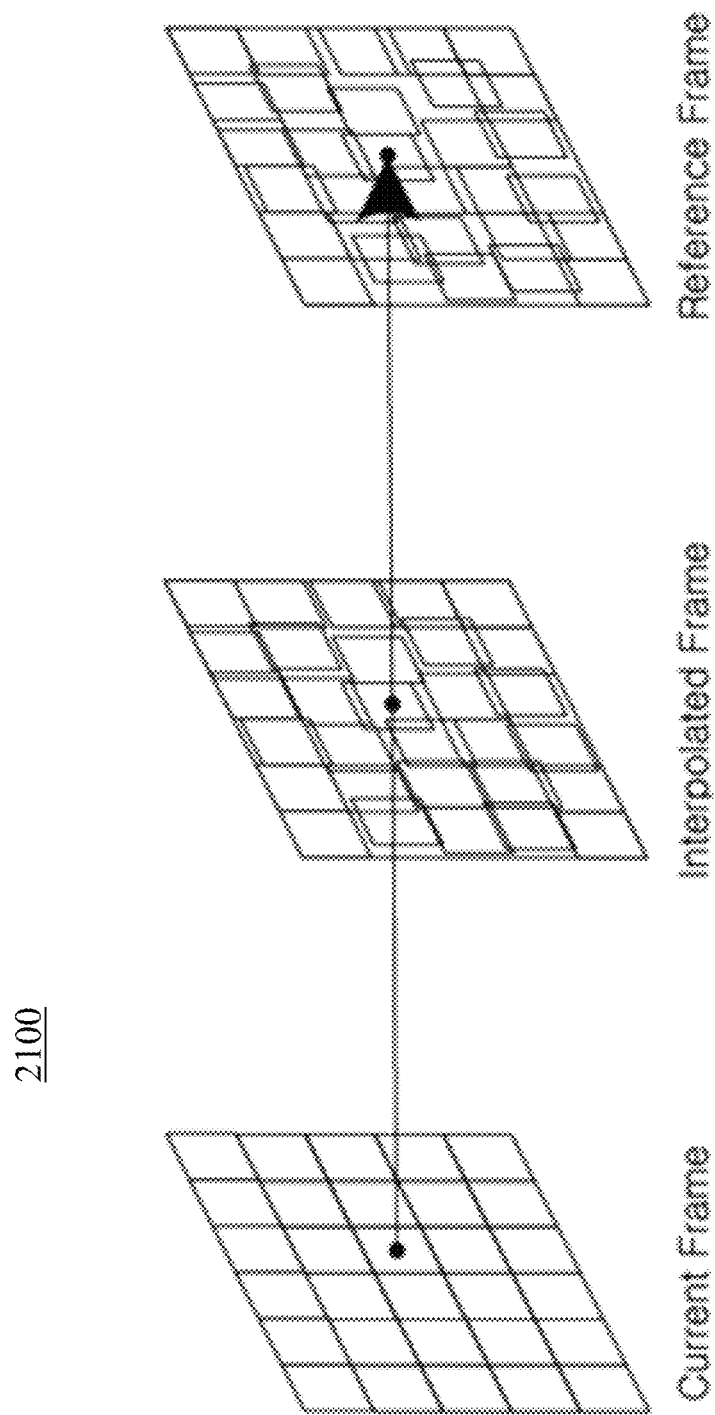
FIG. 21 shows an example of unilateral motion estimation in the FRUC algorithm.

In some embodiments, the motion field of each reference pictures in both reference lists is traversed at 4×4 block level. FIG. 21 shows an example of unilateral Motion Estimation (ME) 2100 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and Matching Cost.

When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad \text{Eq. (4)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

If costBi<=factor*min (cost0, cost1)
  bi-prediction is used;
Otherwise, if cost0<=cost1
  uni-prediction from list0 is used;
Otherwise,
  uni-prediction from list1 is used;

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

3. Drawbacks of Existing Implementations

In some existing implementations, when MV/MV difference (MVD) could be selected from a set of multiple MV/MVD precisions for affine coded blocks, it remains uncertain how more accurate motion vectors may be obtained.

In other existing implementations, the MV/MVD precision information also plays an important role in determination of the overall coding gain of AMVR applied to affine mode, but achieving this goal remains uncertain.

4. Example Methods for MV Predictors for Affine Mode with AMVR

Embodiments of the presently disclosed technology overcome the drawbacks of existing implementations, thereby providing video coding with higher coding efficiencies. The derivation and signaling of motion vector predictors for affine mode with adaptive motion vector resolution (AMVR), based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In some embodiments, the following examples may be applied to affine mode or normal mode when AMVR is applied. These examples assume that a precision Prec (i.e., MV is with 1/(2^Prec) precision) is used for encoding MVD in AF_INTER mode or for encoding MVD in normal inter mode. A motion vector predictor (e.g., inherited from a neighboring block MV) and its precision are denoted by MVPred($MVPred_X$, $MVPred_Y$) and PredPrec, respectively.

Example 1

It is proposed that final MV precision may be kept unchanged, i.e., same as the precision of motion vectors to be stored.

(a) In one example, the final MV precision may be set to 1/16-pel or 1/8-pel.

(b) In one example, the signaled MVD may be firstly scaled and then added to the MVP to form the final MV for one block.

Example 2

The MVP directly derived from neighboring blocks (e.g., spatial or temporal) or default MVPs may be firstly modified and then added to the signaled MVD to form the final MV for a (current) block.

(a) Alternatively, whether to apply and how to apply modifications of MVP may be different for different values of Prec.

(b) In one example, if Prec is greater than 1 (i.e., MVD is with fractional precision), precision of the neighboring MV is not changed and the scaling is not performed.

(c) In one example, if Prec is equal to 1 (i.e., MVD is with 1-pel precision), MV predictor (i.e., neighboring blocks' MV) need to be scaled.

(d) In one example, if Prec is smaller than 1 (i.e., MVD is with 4-pel precision), MV predictor (i.e., neighboring blocks' MV) need to be scaled.

Example 3

In one example, if the precision of MVD signaled is the same as the precision of stored MVs, no scaling is needed after the affine MVs are reconstructed, Otherwise, the MV is reconstructed with the precision of the signaled MVD and then scaled to the precision of the stored MVs.

Example 4

In one example, normal inter mode and AF_INTER mode may choose implementations based on the different examples described above.

Example 5

In one example, a syntax element (or a field comprising more than one bit, e.g., 2 bits) to indicate the MV/MVD precisions for affine mode may be signaled, with the following semantics:

(a) In one example, the syntax element equal to 0, 1 and 2 indicates ¼-pel, 1/16-pel and 1-pel MV precision respectively.

(b) Alternatively, in affine mode, the syntax element equal to 0, 1 and 2 indicates ¼-pel, 1-pel and 1/16-pel MV precision respectively.

(c) Alternatively, in affine mode, the syntax element equal to 0, 1 and 2 indicates 1/16-pel, ¼-pel and 1-pel MV precision respectively.

Example 6

In one example, whether to enable or disable AMVR for affine mode may be signaled in SPS, PPS, VPS, sequence/picture/slice header/tile, etc. al.

Example 7

In one example, indications of allowed MV/MVD precisions may be signaled in SPS, PPS, VPS, sequence/picture/slice header/tile, etc.

(a) Indications of selected MVD precision may be signaled for each coding tree unit (CTU) and/or each region.

(b) The set of allowed MV/MVD precisions may depend on the coded mode of the current block (e.g., affine or non-affine).

(c) The set of allowed MV/MVD precisions may depend on slice type/temporal layer index/low delay check flag.

(d) The set of allowed MV/MVD precisions may depend on block size and/or block shapes of the current or a neighboring block.

(e) The set of allowed MV/MVD precisions may depend on the precision of MVs to be stored in decoded picture buffer.

(i) In one example, if the stored MV is in X-pel, the allowed MV/MVD precision set may at least have X-pel.

The examples described above may be incorporated in the context of the method described below, e.g., methods 2200 and 2300, which may be implemented at a video decoder or a video encoder.

Figure 22:
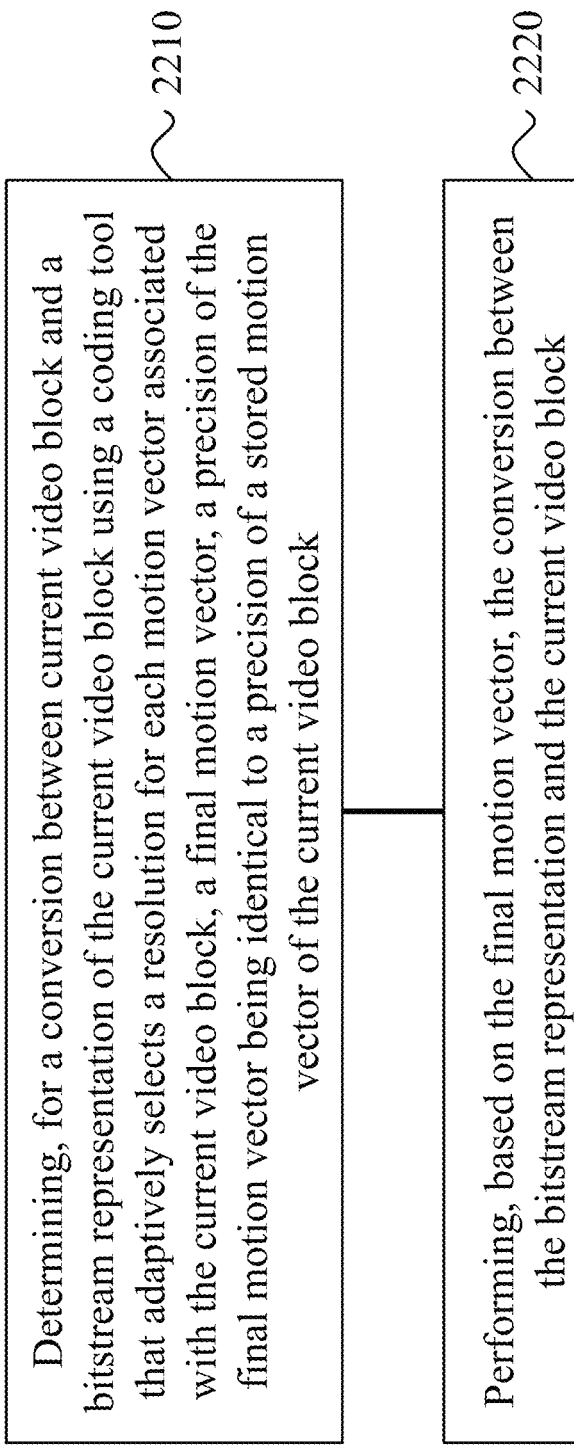
FIG. 22 shows a flowchart of an example method for video processing.

FIG. 22 shows a flowchart of an exemplary method for video decoding. The method 2200 includes, at step 2210, determining, for a conversion between current video block and a bitstream representation of the current video block using a coding tool that adaptively selects a resolution for each motion vector associated with the current video block, a final motion vector, a precision of the final motion vector being identical to a precision of a stored motion vector of the current video block.

The method 2200 includes, at step 2220, performing, based on the final motion vector, the conversion between the bitstream representation and the current video block.

FIG. 23 shows a flowchart of another exemplary method for video decoding. The method 2300 includes, at step 2310, determining, for a conversion between current video block and a bitstream representation of the current video block using a coding tool that adaptively selects a resolution for each motion vector associated with the current video block, a final motion vector, the current video block being coded with an affine mode, and the bitstream representation comprising a field comprising more than one bit that is indicative of a precision of a motion vector or a motion vector difference associated with the current video block.

The method 2300 includes, at step 2320, performing, based on the final motion vector, the conversion between the bitstream representation and the current video block.

In some embodiments, the following technical solutions may be implemented:

A1. A method (e.g., method 2200 in FIG. 22) for video processing, comprising: determining (2210), for a conversion between current video block and a bitstream representation of the current video block using a coding tool that adaptively selects a resolution for each motion vector associated with the current video block, a final motion vector, wherein a precision of the final motion vector is identical to a precision of a stored motion vector of the current video block; and performing (2220), based on the final motion vector, the conversion between the bitstream representation and the current video block.

A2. The method of solution A1, wherein the precision of the final motion vector is 1/16-pel.

A3. The method of solution A1, wherein the precision of the final motion vector is ⅛-pel.

A4. The method of any of solutions A1 to A3, wherein the final motion vector is based on adding a motion vector predictor (MVP) to a motion vector difference (MVD).

A5. The method of solution A4, wherein the MVD is scaled prior to adding the MVP to the MVD.

A6. The method of solution A4, wherein the MVP is derived from a spatially or temporally neighboring block.

A7. The method of solution A4, wherein the MVP is a default MVP.

A8. The method of solution A6 or A7, wherein the MVP is modified prior to adding the MVP to the MVD.

A9. The method of solution A7, wherein modifying the MVP is based on a precision of the MVD.

A10. The method of solution A9, further comprising: bypassing a scaling operation for the MVP upon a determination that the precision of the MVD is fractional.

A11. The method of solution A9, further comprising: scaling the MVP upon a determination that the precision of the MVD is less than or equal to 1.

A12. The method of solution A4, further comprising: bypassing a scaling operation for the final motion vector upon a determination that the precision of the MVD is identical to the precision of the stored motion vector.

A13. The method of solution A4, further comprising: scaling the final motion vector upon a determination that the precision of the MVD is different from the precision of the stored motion vector.

A14. The method of any of solutions A1 to A13, wherein the current video block is coded with a non-affine inter mode or an affine inter mode.

A15. The method of any of solutions A1 to A14, wherein the coding tool that adaptively selects the resolution for each motion vector is an adaptive motion vector resolution (AMVR) tool.

A16. The method of any of solutions A1 to A15, wherein the conversion generates the current video block from the bitstream representation.

A17. The method of any of solutions A1 to A15, wherein the conversion generates the bitstream representation from the current video block.

A18. An apparatus in a video system comprising a processor and a non-transitory memory with instructions thereon, wherein the instructions upon execution by the processor, cause the processor to implement the method in any one of solutions A1 to A17.

A19. A computer program product stored on a non-transitory computer readable media, the computer program product including program code for carrying out the method in any one of solutions A1 to A17.

In addition to the above solutions, in some embodiments, the following solutions may be implemented:

B1. A method for video processing, comprising: determining, for a conversion between current video block and a bitstream representation of the current video block using a coding tool that adaptively selects a resolution for each motion vector associated with the current video block, a final motion vector, wherein the current video block is coded with an affine mode, and wherein the bitstream representation comprises a field comprising more than one bit that is indicative of a precision of a motion vector or a motion vector difference associated with the current video block; and performing, based on the final motion vector, the conversion between the bitstream representation and the current video block.

B2. The method of solution B1, wherein different values of the field indicate that the precision of the motion vector or the motion vector difference is ¼-pel, ¹⁄₁₆-pel or 1-pel.

B3. The method of solution B2, wherein a value of 0, 1 or 2 for the field corresponds to the precision of the motion vector being ¼-pel, ¹⁄₁₆-pel and 1-pel, respectively.

B4. The method of solution B2, wherein a value of 0, 1 or 2 for the field corresponds to the precision of the motion vector being ¼-pel, 1-pel and ¹⁄₁₆-pel, respectively.

B5. The method of solution B2, wherein a value of 0, 1 or 2 for the field corresponds to the precision of the motion vector being ¹⁄₁₆-pel, ¼-pel and 1-pel, respectively.

B6. The method of any of solutions B1 to B5, wherein the coding tool for an affine mode is enabled based on a signaling in a sequence parameter set (SPS), a picture parameter set (PPS), a video parameter set (VPS), a slice header, a tile header, a sequence header or a picture header.

B7. The method of any of solutions B1 to B5, wherein a set of allowed values for the precision of the motion vector or the motion vector difference for an affine mode or a non-affine mode is signaled in a sequence parameter set (SPS), a picture parameter set (PPS), a video parameter set (VPS), a slice header, a tile header, a sequence header or a picture header.

B8. The method of solution B7, wherein the set of allowed values is signaled for each coding tree unit (CTU) of the current block.

B9. The method of solution B7, wherein the set of allowed values is based on a coded mode or dimensions of the current block.

B10. The method of solution B9, wherein the coded mode is an affine mode or a non-affine mode.

B11. The method of solution B7, wherein the set of allowed values is based a slice type, a temporal layer index or a low delay check flag.

B12. The method of solution B7, wherein the set of allowed values is based on a precision of a motion vector stored in a decoded picture buffer.

B13. The method of any of solutions B1 to B12, wherein the coding tool that adaptively selects the resolution for each motion vector is an adaptive motion vector resolution (AMVR) tool.

B14. The method of any of solutions B1 to B13, wherein the conversion generates the current video block from the bitstream representation.

B15. The method of any of solutions B1 to B13, wherein the conversion generates the bitstream representation from the current video block.

B16. An apparatus in a video system comprising a processor and a non-transitory memory with instructions thereon, wherein the instructions upon execution by the processor, cause the processor to implement the method in any one of solutions B1 to B15.

B17. A computer program product stored on a non-transitory computer readable media, the computer program product including program code for carrying out the method in any one of solutions B1 to B15.

5. Example Implementations of the Disclosed Technology

Figure 24:
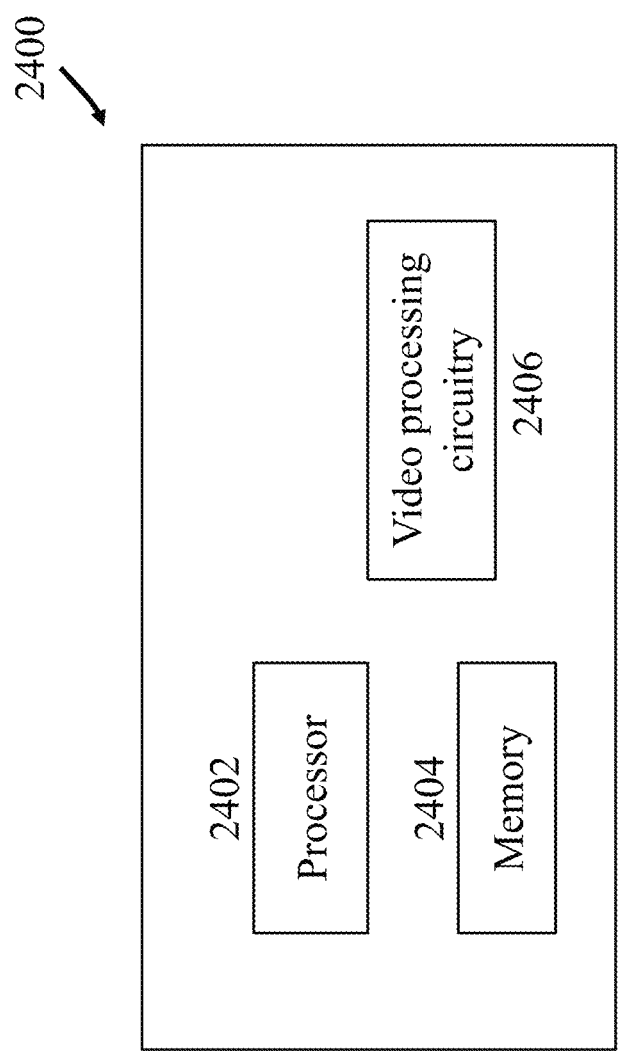
FIG. 24 is a block diagram of an example of a hardware platform for implementing a visual media decoding or a visual media encoding technique described in the present document.

FIG. 24 is a block diagram of a video processing apparatus 2400. The apparatus 2400 may be used to implement one or more of the methods described herein. The apparatus 2400 may be embodied in a smartphone, tablet, computer, Internet of Things (IoT) receiver, and so on. The apparatus 2400 may include one or more processors 2402, one or more memories 2404 and video processing hardware 2406. The processor(s) 2402 may be configured to implement one or more methods (including, but not limited to, methods 2200 and 2300) described in the present document. The memory (memories) 2404 may be used for storing data and code used for implementing the methods and techniques described herein. The video processing hardware 2406 may be used to implement, in hardware circuitry, some techniques described in the present document.

In some embodiments, the video coding methods may be implemented using an apparatus that is implemented on a hardware platform as described with respect to FIG. 24.

Figure 25:
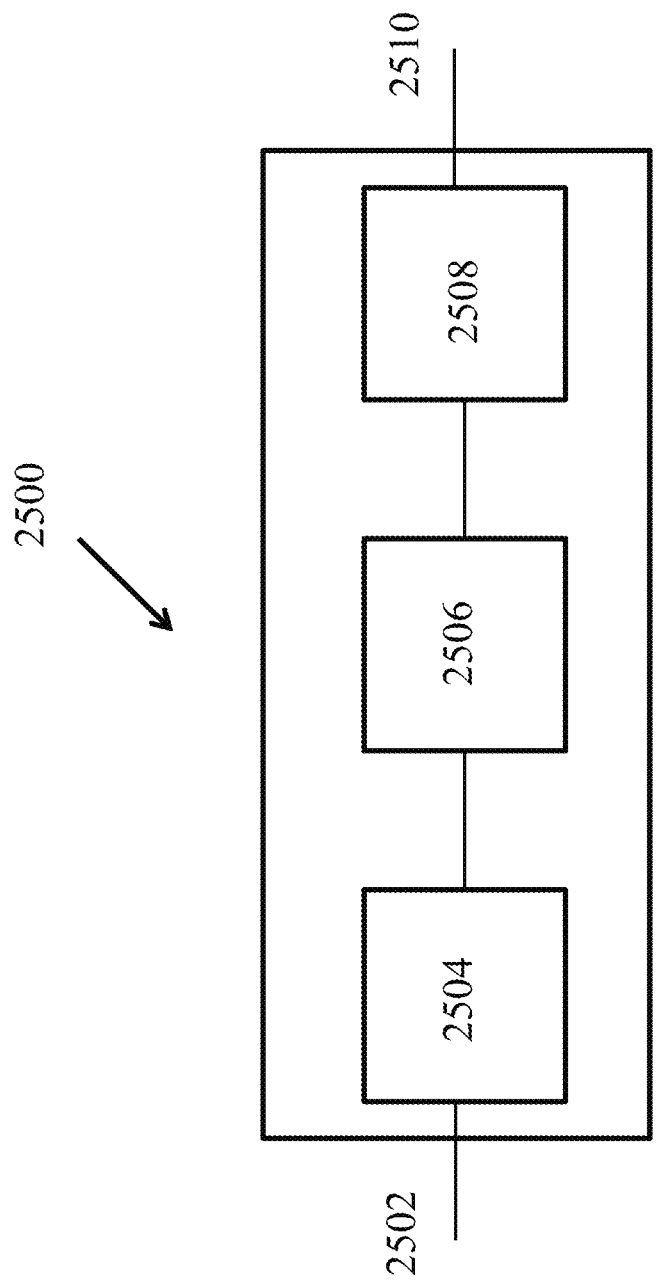
FIG. 25 is a block diagram of an example video processing system in which disclosed techniques may be implemented.

FIG. 25 is a block diagram showing an example video processing system 2500 in which various techniques disclosed herein may be implemented. Various implementations may include some or all of the components of the system 2500. The system 2500 may include input 2502 for receiving video content. The video content may be received in a raw or uncompressed format, e.g., 8 or 10 bit multi-component pixel values, or may be in a compressed or encoded format. The input 2502 may represent a network interface, a peripheral bus interface, or a storage interface.

Examples of network interface include wired interfaces such as Ethernet, passive optical network (PON), etc. and wireless interfaces such as Wi-Fi or cellular interfaces.

The system 2500 may include a coding component 2504 that may implement the various coding or encoding methods described in the present document. The coding component 2504 may reduce the average bitrate of video from the input 2502 to the output of the coding component 2504 to produce a coded representation of the video. The coding techniques are therefore sometimes called video compression or video transcoding techniques. The output of the coding component 2504 may be either stored, or transmitted via a communication connected, as represented by the component 2506. The stored or communicated bitstream (or coded) representation of the video received at the input 2502 may be used by the component 2508 for generating pixel values or displayable video that is sent to a display interface 2510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising:
   determining, for a signaled motion vector difference (MVD) of a current video block, a first precision from a precision set;
   acquiring, based on the first precision, a motion vector with a predefined second precision, wherein the second precision is identical to a precision of stored motion vectors for prediction of blocks, wherein the motion vector is based on adding a motion vector predictor (MVP) to the motion vector difference (MVD); and
   coding, based on the motion vector, the current video block.

2. The method of claim 1, wherein the second precision is 1/16-pel precision.

3. The method of claim 1, wherein the MVD is scaled prior to adding the MVP to the MVD.

4. The method of claim 1, wherein the MVP is modified prior to adding the MVP to the MVD based on the first precision.

5. The method of claim 1, wherein whether and how to modify the MVP is based on the first precision.

6. The method of claim 5, further comprising:
   scaling the MVP upon a determination that the first precision is coarser than or equal to 1-pel precision.

7. The method of claim 1, wherein the MVP is derived from at least one of a spatially neighboring block, or a temporally neighboring block, or is a default MVP.

8. The method of claim 1, wherein the precision set comprises 1/16-pel precision, 1/4-pel precision and 1-pel precision.

9. The method of claim 1, wherein the first precision is indicated in bitstream.

10. The method of claim 1, wherein the current video block is coded with an affine inter mode.

11. The method of claim 1, wherein the first precision is determined using an adaptive motion vector resolution (AMVR) tool.

12. The method of claim 1, wherein the coding comprises encoding the current video block into bitstream representation.

13. The method of claim 1, wherein the coding comprises decoding the current video block from bitstream representation.

14. An apparatus for video processing comprising a processor and a non-transitory memory with instructions thereon, wherein the instructions upon execution by the processor, cause the processor to:
   determine, for a signaled motion vector difference (MVD) of a current video block, a first precision from a precision set;
   acquire, based on the first precision, a motion vector with a predefined second precision, wherein the second precision is identical to a precision of stored motion vectors for prediction of blocks, wherein the motion vector is based on adding a motion vector predictor (MVP) to the motion vector difference (MVD); and
   code, based on the motion vector, the current video block.

15. The apparatus of claim 14, wherein the second precision is 1/16-pel precision.

16. The apparatus of claim 14, wherein the MVD is scaled prior to adding the MVP to the MVD.

17. The apparatus of claim 14, wherein whether and how to modify the MVP is based on the first precision.

18. The apparatus of claim 14, wherein the precision set comprises 1/16-pel precision, 1/4-pel precision and 1-pel precision.

19. The apparatus of claim 14, wherein the first precision is indicated in bitstream.

20. A non-transitory computer-readable storage medium storing instructions that cause a processor to:
   determine, for a signaled motion vector difference (MVD) of a current video block, a first precision from a precision set;
   acquire, based on the first precision, a motion vector with a predefined second precision, wherein the second precision is identical to a precision of stored motion vectors for prediction of blocks, wherein the motion vector is based on adding a motion vector predictor (MVP) to the motion vector difference (MVD); and
   code, based on the motion vector, the current video block.

* * * * *